United States Patent Office 3,102,188
Patented Aug. 27, 1963

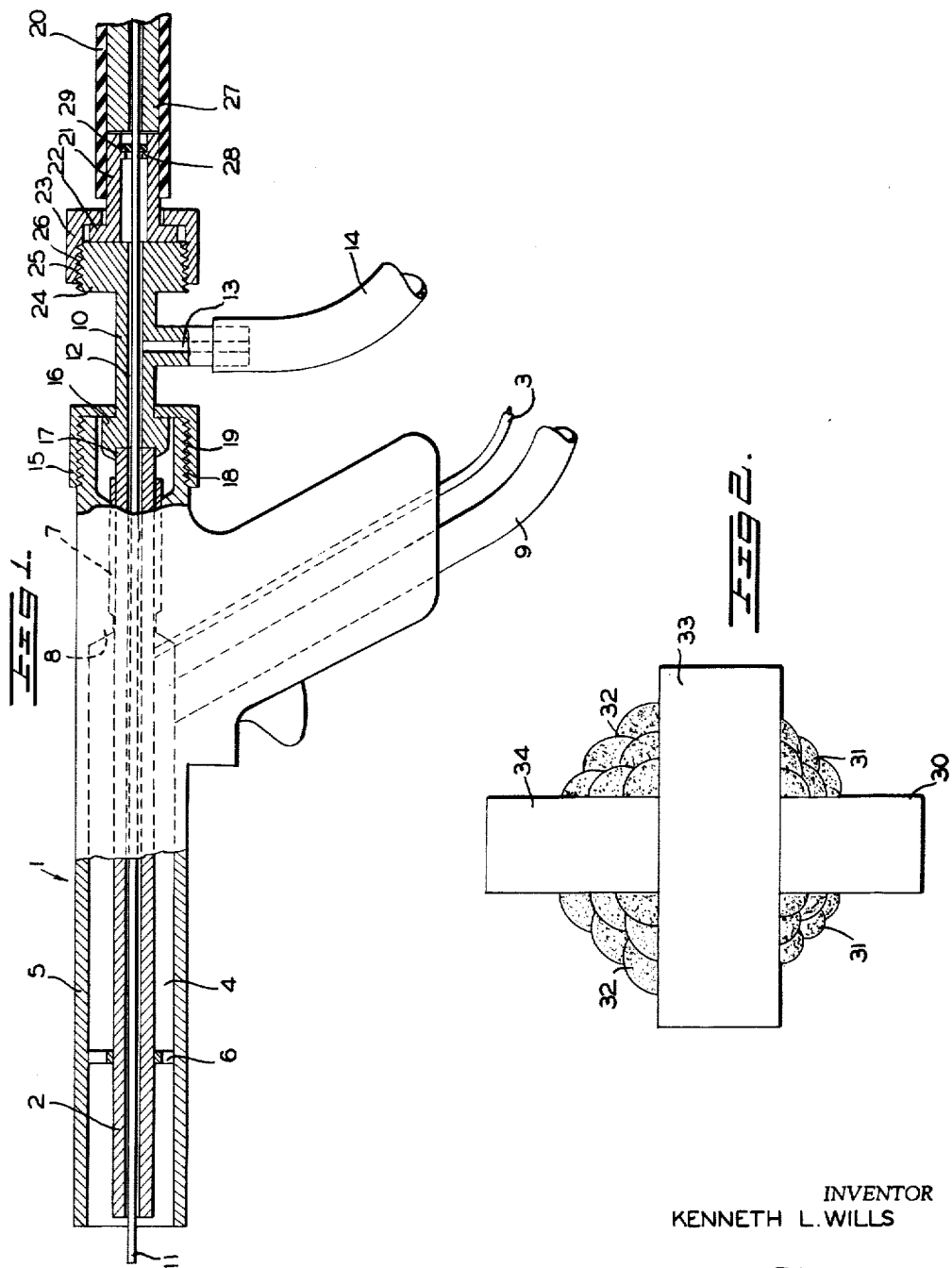

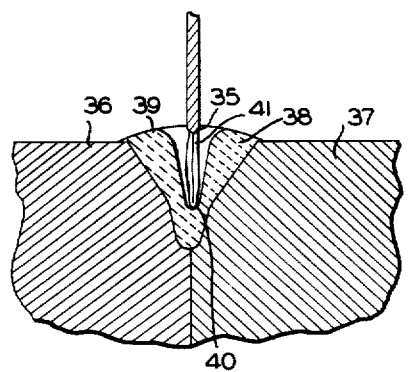
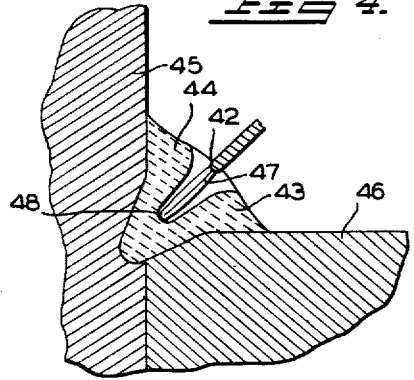

3,102,188
WELDING METHOD
Kenneth L. Wills, Portland, Oreg., assignor to Kaiser Aluminum & Chemical Corporation, Oakland, Calif., a corporation of Delaware
Filed Aug. 12, 1959, Ser. No. 833,331
5 Claims. (Cl. 219—74)

This invention relates to electric arc welding methods and apparatus. More particularly, this invention relates to improvements in the method and apparatus for gas shielded arc welding of metals.

In the art of welding various metals, particularly aluminum and aluminum alloys, the use of inert-gas shielded arc welding is common practice today. Such welding practice includes the use of either consumable or non-consumable electrodes and customarily is either automatic or semi-automatic in operation. Although not limited thereto, the present invention has particular application in welding practices characterized as semi-automatic welding wherein a filler wire, constituting a consumable electrode is fed automatically to a hand gun held by the operator and wherein by actuation of the gun trigger the filler wire is fed to the weld vicinity wherein a welding arc is formed and maintained within an envelope of shielding gas, e.g. argon, helium, or mixtures thereof, and which gas also blankets the molten metal pool. In such a process the operator moves the gun manually so that the point of the wire electrode follows the surfaces to be welded and as the welding operation proceeds the filler wire is fed automatically into and through the hand gun held by the operator. One example of conventional apparatus for performing semiautomatic welding is disclosed in Muller et al. Patent No. 2,504,868 and wherein the apparatus generally comprises a gas cylinder for supplying the inert gas to the welding gun for shielding the arc, a reel of electrode wire with suitable electrical means for feeding the wire to the gun, a suitable direct current welding generator for providing current for the arc and wherein the negative terminal of the generator is connected to the workpiece and the positive terminal to the electrode, thus providing what is characterized as reverse polarity for the welding arc, and suitable means to control the flow of shielding gas, the passage of current through the electrode wire, and actuation of the electrode wire feeding means.

Although many metals, such as aluminum and aluminum alloys, copper and copper alloys, which are not easily welded by more conventional methods are readily joined by the inert-gas shielded-arc welding method, using either a consumable or non-consumable electrode, it has been found that it is extremely difficult to consistently produce sound welds due to the presence of porosity therein. In addition, inert-gas shielded-arc welding is a very expensive operation as a result of the high cost of inert gases.

Accordingly, it is a purpose of this invention to provide an improved method and apparatus for gas shielded arc welding of metals which is productive of welds wherein the presence of porosity has been eliminated or substantially reduced and wherein the cost of the shielding gases is substantially reduced.

The various advantages of the invention will become more apparent from the following detailed description and the accompanying drawings, wherein:

FIGURE 1 is a diagrammatical illustration partly in section of a conventional welding gun for gas shielded arc welding of metals modified in accordance with this invention.

FIGURE 2 is an illustration of a tensile specimen employed for testing the strength of fillet welds produced in accordance with this invention.

FIGURE 3 is a sectional illustration of the position of a welding electrode tip employed in accordance with this invention where a semi-inert gas surrounding an inert gas is employed in making a V-groove weld.

FIGURE 4 is a sectional illustration of the position of a welding electrode tip employed in accordance with this invention where a semi-inert gas surrounding an inert gas is employed in making a fillet weld.

In accordance with the method of this invention, an arc is established between an electrode and the workpiece, which electrode may be of the consumable type wherein it is fed from a source to the welding head. In such a case the electrode is fed into said arc through a tubular member or contact tube which provides both a guiding means and a means for making electrical contact with the electrode or filler metal. Such contact tube generally has an inside diameter slightly larger than said filler metal. A protective gaseous medium is supplied and delivered to a point where it surrounds the arc and blankets the workpiece and is in intimate contact with the arc and the molten metal weld pool so that the weld zone, i.e., the weld pool and arc area, is protected from the natural atmosphere. In accordance with this invention, a portion of the protective gaseous medium is introduced, by suitable means, longitudinally of the filler metal electrode in the direction of the arc, thereby providing an inner shield closely surrounding the electrode, arc and weld pool. One example of a suitable means for practicing this invention, is by providing the contact tube with a suitable fitting so that this portion of gas may be passed therethrough. A seal around the welding wire electrode may be provided to prevent the gas from escaping except through the nozzle or exit end of the contact tube. The remainder of the gaseous medium may then be passed through the annular space between the contact tube and the barrel of the gun which is conventionally provided for the passage of protective gaseous medium, thereby forming an outer shield.

According to conventional practices, the protective gas shielding consists entirely of inert gases, such as argon, helium or mixtures thereof, which are very expensive. It has been found in accordance with this invention that if a small quantity of inert gas is passed through the contact tube, semi-inert gases may be used in the outer shield thus effecting a substantial reduction in shielding gas cost. By the terms "semi-inert gases" as used hereinafter in the specification and the claims are meant gases which under conditions encountered in the outer shield are substantially inactive, that is, will not readily combine with other substances, e.g. the metals being welded and the atmosphere. Examples of semi-inert gases within the above definition are nitrogen and carbon dioxide. It has been found that the gases in the outer shield tend to confine the inert gas to the vicinity of the arc preventing it from being dissipated whereby effective welds can be produced with a small amount of inert gas. By substituting semi-inert gases, such as nitrogen and carbon dioxide, for inert gases in the outer shield an approximate 10 to 1 reduction in the amount of inert shielding gas conventionally used for inert gas metal arc welding may be made. When employing a semi-inert outer shielding gas, it has been found that a deep indentation 40 and 48 is produced in the molten metal 38 and 43 directly below the electrode tip 35 and 42 as shown in FIGURES 3 and 4 of the drawings. Where a consumable metal electrode is employed, the electrode tip 35 and 42 is the burn off point of the filler wire. It has been found that where a semi-inert outer shielding gas is employed, it is essential in the production of satisfactory welds that the electrode tip 35 and 42 be maintained in close proximity to the plane defined by the rim 39 and 44 of the indentation 40 and 48 in the molten metal 38 and 43 whereby the entire length of the arc 41 and 47 is substantially below the surface of the solidified weld metal. This position is indicated in FIGURES 3 and 4, FIGURE 3 showing the application to a V-groove weld between plates 36 and 37, whereas FIGURE 4 shows the application to a fillet weld between plates 45 and 46. By the expression "rim of the indentation," as used hereinafter is meant, the locus of the highest points in the molten metal 38 and 43 surrounding the indentations 40 and 48.

In accordance with U.S. Patent No. 2,852,659, it has been found that by the addition of a small but effective amount of a halogen-containing substance to the inert shielding gas a significant improvement in weld soundness could be attained. The halogen-containing substance, which may be in the liquid, gaseous, or solid state and which may be supplied by one or more suitable halides and/or elemental halogen, should be free or essentially free of the elements carbon and hydrogen. Examples of suitable halides are magnesum chloride, sodium chloride, aluminum trichloride, zirconium tetrachloride, silicon tetrachloride, titanium tetrachloride, boron trichloride, and boron trifluoride. An example of a suitable halogen is chlorine in the gaseous state. It has now been found that the effectiveness of the halogen-containing substance additions may be further increased by mixing a small quantity of one or more halides and/or halogen with a portion of a suitable inert gas, such as argon, helium or mixtures thereof, and passing this portion of gas as an inner shield surrounding the arc and weld pool, such as can be accomplished by passing this portion of gas through the contact tube. It has been found that the action of the halogen-containing substance is effectively increased when introduced in this way. The halide and/or halogen containing inert gas inner shield may be employed advantageously with either an inert gas or a semi-inert gas outer shield.

The preferred inert gases employed in accordance with this invention are argon, helium and mixtures thereof. A mixture which is commonly used and found to be very successful comprises 75% helium and 25% argon and is known under the tradename "Airco 75." Where a semi-inert gas is employed as the outer shielding gas nitrogen is preferred.

It is the presently preferred practice of those embodiments of the invention employing halide and/or halogen additions to the gas passing through the contact tube that said addition should be gaseous chlorine which is admixed in suitable proportions with the inert gas.

It has been found that improved results can be achieved where the rate of flow of halogen in the gas passing through the contact tube is as low as about 0.001 cubic feet per hour. The preferred range of halogen flow rate is from about 0.001 cubic feet per hour to 0.36 cubic feet per hour. Flow rates greater than 0.36 cubic feet per hour have been used but no advantage has been seen to flow therefrom. Moreover, the use of greater amounts of halogen may present a serious problem regarding safety of the workmen due to excessive inhalation of same. In addition, it has been found that in the welding of aluminum alloys containing relatively large amounts of magnesium and alloying constituents the use of greater amounts of halogen resulted in excessive removal of magnesium from the weld metal thereby giving a marked reduction in weld strength, although the welds were found to be free or essentially free from porosity.

In the preferred practice of this invention, the halogen employed is chlorine and the inert gas is either argon or helium. Where maximum freedom from porosity is desired, it is preferred to employ from about 35 to 90 cubic feet per hour of argon or from about 50 to 150 cubic feet per hour of helium as the outer shielding gas and from about 0.035 to 12 cubic feet per hour of a mixture consisting of 97% by volume argon or helium and 3% by volume chlorine through the contact tube. This provides a chlorine flow of from about 0.001 cubic feet per hour to 0.36 cubic feet per hour. For many applications a mixture of 99.5% by volume argon or helium and 0.5% by volume chlorine may be passed through the contact tube. With this mixture a flow rate of at least 0.2 cubic feet per hour is required to provide a chlorine flow of at least 0.001 cubic feet per hour. The optimum flow rate for the 97% inert gas, i.e. argon or helium, 3% chlorine mixture is about 0.5 cubic feet per hour. This provides a chlorine flow of about 0.015 cubic feet per hour.

Where high quality welds characterized by substantial freedom from porosity are desired, but wherein maximum freedom from porosity is not essential, it is preferred to reduce the quantity or rate of flow of both the inert gas and the chlorine thereby reducing the cost of producing the weld. In such applications it is preferred to employ from about 20 to 35 cubic feet per hour of argon or from about 25 to 50 cubic feet per hour of helium as the outer shielding gas and from about 0.2 cubic feet per hour to 12 cubic feet per hour of a mixture of 99.5% inert gas, i.e. argon or helium, and 0.5% chlorine through the contact tube. This provides a chlorine flow of from about 0.001 to 0.06 cubic feet per hour. The optimum flow rate for the 99.5% inert gas, i.e. argon or helium, 0.5% chlorine mixture is about 2 cubic feet per hour which provdies about 0.01 cubic feet per hour of chlorine.

With reference to the FIGURE 1, a conventional welding gun 1 is shown comprising a suitable barrel 5 and contact tube 2 positioned concentrically within gun barrel 5 by suitable supporting means such as a spacer 6 and by a collet 7 fitting within a restricted portion 8 at the rear of gun 1. An aluminum or copper cable 3 is used to bring electrical power to the welding gun 1, said cable being connected electrically to the contact tube 2. The outer shielding gas is conducted to the gun 1 by a suitable hose 9 from which it passes into the annular space 4 between contact tube 2 and the barrel 5 of gun 1.

In accordance with this invention, conventional welding gun 1 is modified by attaching a suitable fitting 10 to the rear portion of the gun 1 where the filler wire or electrode 11 enters the gun. Fitting 10 has an opening 12 through which filler wire 11 may pass freely and has a side opening 13 whereby the gas to be passed down the contact tube may enter. The gas to be passed down the contact tube is supplied through a suitable hose 14 which is attached to said side opening 13 of fitting 10. Fitting 10 is attached to the rear portion of gun 1 by means of a coupling 15 and a collar 16. Collar 16 has an axial recess 17 adapted to receive in close engagement therewith the end of contact tube 2. Coupling 15 is provided with internal threads 18 which engage external threads 19 on the end portion of welding gun 1.

Filler wire 11 is conventionally supplied to the welding gun through a hose or conduit 20 having a liner 27 for guiding the filler wire 11. In order to fasten hose or conduit 20 to fitting 10, a member 21 is affixed by suitable means such as bonding to the end of conduit 20, said member 21 being provided with a collar 22 and an internally threaded coupling 23. Fitting 10 is fastened to member 21 by means of enlarged portion 24, the threads 25 on enlarged portion 24 being adapted to engage the threads 26 on coupling 23.

When fitting 10 is suitably affixed in position as shown in FIGURE 1, gas entering through hose 14 may be prevented from escaping through conduit 20 by suitable sealing means. Such a sealing means may consist of a disc 29 of suitable material, such as nylon, having a center opening of a diameter substantially the same as the diameter of filler wire 11 and an outside diameter substantially the same as the inside diameter of member 21. Disc 29 may be mounted within member 21 and retained in position by means of a shoulder 28 in member 21.

The embodiment depicted in FIGURE 1 sets forth one embodiment of suitable apparatus for practicing the invention and is not to be construed as limiting the scope of the invention. Other suitable apparatus for introducing the inner shield of gas may be employed, for example, an attachment for the nozzle or exit end of the welding gun wherein is provided means for introducing the inner shield of gas longitudinally of the filler wire electrode in the direction of the arc at a point below the exit end of the contact tube.

The aluminum alloys employed in the examples below are identified by the Aluminum Association designations. The percentages of elements other than aluminum in these alloys are indicated in Table 1 below. The figures in Table 1 indicate maximums unless a range is shown.

TABLE I

| Alloy | Silicon | Iron | Copper | Manganese | Magnesium | Chromium | Zinc | Titanium |
|---|---|---|---|---|---|---|---|---|
| 5083 | 0.40 | 0.40 | 0.10 | 0.30–1.0 | 4.0–4.9 | 0.05–0.25 | 0.25 | 0.15 |
| 5086 | 0.40 | 0.50 | 0.10 | 0.20–0.7 | 3.5–4.5 | 0.05–0.25 | 0.25 | 0.15 |
| 6061 | 0.40–0.8 | 0.7 | 0.15–0.40 | 0.15 | 0.8–1.2 | 0.15–0.35 | 0.25 | 0.15 |
| 5356 | 0.50 Si+Fe | | 0.10 | 0.05–0.20 | 4.5–5.5 | 0.05–0.20 | 0.10 | 0.06–0.20 |
| 4043 | 4.5–6.0 | 0.8 | 0.30 | 0.05 | 0.05 | | 0.10 | 0.20 |

The improved results obtained by the practice of this invention are more fully illustrated with reference to the following examples. It is to be distinctly understood that these are by way of example and not limitation.

Example I

Two multi-pass V-groove welds were made in flat position between ½ inch plate sections of aluminum alloy 5083 having a nominal chemical composition of approximately 4.5% magnesium and 0.75% manganese, balance aluminum and normal impurities. The welding process used in making the welds was inert-gas shielded-arc welding with a consumable filler metal electrode wire $\frac{1}{16}$ inch in diameter, having a chemical composition the same as that of the parent metal. This filler metal electrode wire was obtained from a lot of electrode wire which was known from previous experience to produce unsatisfactory welds when conventional welding techniques were employed. The welding gun employed was similar to that shown in FIGURE 1 wherein the inside diameter of the gun barrel was 0.750 inch. The contact tube had an inside diameter 0.081 inch, and an outside diameter of 0.250 inch. The inert gas used in making these welds was argon which was all passed through the annular space surrounding the contact tube. No gas was passed through the contact tube. The total gas flow was approximately 50 cubic feet per hour on all passes. A welding current of about 250 amperes and an arc voltage of about 24 volts measured between the welding gun and the work was used. D.C. reverse polarity was employed, and a total of 7 passes made at a travel speed of 14 inches per minute on the first pass and 18 inches per minute for the remaining passes. Radiographs of both welds indicated a large amount of porosity in the weld metal. Radiography is a well known nondestructive test method which shows the presence and nature of microscopic defects or other structural discontinuities in the interior of welds. Radiographic examination for weld soundness is standard practice.

Example II

Three additional welds were made from the same lot of plate and welding wire and identical welding conditions, including wire size, size of contact tube, and size of gun barrel as used in Example I except that small quantities of argon—3% chlorine gas mixture was introduced into the arc area through the contact tube at a rate of approximately 10 cubic feet per hour for the first weld, 4 cubic feet per hour for the second weld and 1 cubic foot per hour for the third weld. Since 3% of this mixture was chlorine, chlorine was introduced at a rate of 0.3 cubic feet per hour for the first weld, 0.12 cubic feet per hour for the second weld and 0.03 cubic feet per hour for the third weld. As in the first example, straight argon at a rate of 50 cubic feet per hour was passed through the annular space between the contact tube and the gun barrel. Accordingly, the percent of chlorine in the total shielding gas was about 0.5% by volume for the first weld, 0.2% by volume for the second weld and .06% by volume for the third weld. Although these welds were made from the same lot of plate and welding wire as Example I, nevertheless all three of the welds of Example II were very sound and radiographs of them indicated freedom from porosity.

Example III

Three additional welds were made with the same lot of plate and filler wire and under identical welding conditions, including wire size, size of contact tube and size of gun barrel as above with the same quantities of argon—3% chlorine gas mixture employed in Example II. However, the argon—3% chlorine gas mixture was introduced into the main stream of argon gas passing through the annular space between the gun barrel and the contact tube. The total gas flow was the same as in Example II, i.e. approximately 50 cubic feet per hour of straight argon plus the above quantities of argon—3% chlorine gas mixture. No gas was passed through the contact tube. The welds were generally sound, however due to the use of the same lot of aluminum alloy plate as Example I, radiographs of these welds indicated the presence of porosity in some of the welds.

Examples I, II and III demonstrate conclusively the improved results which may be obtained by passing the inert gas-chlorine mixture through the contact tube as opposed to adding it to the inert gas passing through the annular space between the contact tube and the gun barrel, since even with the same lot of aluminum alloy plate as employed in Example I, radiographs of the welds of Example II showed freedom from porosity.

Example IV

Twenty-four multi-pass V-groove welds were made between ½ inch plate sections of electrical conductor grade aluminum alloy, i.e. 99.45% minimum purity aluminum, and aluminum alloys 6061, 5086 and 5083, chemical compositions of which are given in Table I above. Three welds between base plates of each alloy were made in the vertical position and three welds between base plates of each alloy were made in the overhead position. The welding process used in making the welds was inert-gas shielded-arc welding with a consumable filler metal electrode wire $\frac{1}{16}''$ in diameter. The filler metal employed for welding the electrical conductor grade aluminum plates was 1100, i.e. 99.00% minimum purity aluminum, and the filler metal employed for the remaining alloys was 5356, the composition of which is given in Table I above. The welding gun employed was the same as that employed in Example I. The inert gas used in making these welds was argon which was passed through the annular space surrounding the contact tube at a flow rate approximately 20 cubic feet per hour. A mixture of 99.5% helium and 0.5% chlorine gas was introduced in the arc area through the contact tube at a rate of 2 cubic feet per hour. Since 0.5% of this mixture was chlorine, chlorine was introduced at a rate of 0.01 cubic feet per hour. A welding current of about 210 amperes and an arc voltage of about 6 volts measured between the welding gun and the work was employed for welding plates of electrical conductor grade aluminum and a welding current of about 180 amperes and an arc voltage of about 25 volts measured between the welding gun and the work was employed in welding all other alloys. D.C. reverse polarity was employed. Four passes were made in all welded joints of electrical conductor grade and 6061 aluminum alloys and for the vertical position welds of alloys 5086 and 5083. For the overhead welds of alloys 5086 and 5083 five passes were made. All welds were very sound and radiographs of them indicated substantial freedom from porosity.

*Example V*

Several multi-pass V-groove welds were made in each of four positions, i.e. flat, vertical, horizontal and overhead, between plate sections of aluminum alloy 5086 having a chemical composition as indicated in Table I above, and having thicknesses as indicated in Table II below. The welding process used in making the welds was inert-gas shielded-arc welding with a consumable filler metal electrode wire of alloy 5356 which has a chemical composition as indicated in Table I above and having a diameter as indicated in Table II below. The welding gun employed was the same as that employed in Example I. The inert gases which were passed through the annular space surrounding the contact tube and the composition of the inert gas chlorine mixtures passing down the contact tube are indicated in Table II below along with the respective rates of flow. The welding current, the arc voltage measured between the welding gun and the work, the number of passes made and the travel speed of the passes are all indicated in Table II below. All welds produced were very sound and radiographs of them indicated freedom from porosity.

electrode tip. No preheating was used and the beads were wire brushed between passes. All the welds of this example had a good surface appearance and bead contour and exhibited excellent weld penetration. Tensile tests were performed on 16 specimens sectioned from the above welds. These specimens were obtained by cutting a 1 inch thick slice from the welded composite to form the cross shaped specimen illustrated in FIGURE 2. In order to insure fracture on either 1 inch plate 30 or welds 31 the welds 32 between 1¼ inch plate 33 and 1 inch plate 34 were made substantially heavier and stronger than welds 31 through the use of heavier passes. All the specimens fractured in the parent plate 30 at loads ranging from 12,250 to 13,950 pounds per square inch.

*Example VII*

Several multi-pass fillet welds were made in the horizontal position between ½ inch plate sections of electrical conductor grade aluminum alloy, i.e., 99.45% minimum purity aluminum. The filler wire employed was ³⁄₃₂ inch diameter 1100 aluminum alloy, i.e., 99.00% minimum purity aluminum. The size of the gun barrel and contact tube of the welding gun was the same as for Example VI. The welding process used in making the welds was basically the same as in Example VI with the exception of kind and quantities of shielding gas employed. Shielding gases used in making all welds were argon and nitrogen. Argon was passed through the contact tube at a rate of 5 cubic feet per hour while 20 cubic feet per hour of nitrogen gas was passed through the annular space between the contact tube and the gun barrel. Somewhat better visibility was noted when using argon through the contact tube instead of helium but the wetting action was somewhat reduced. Tensile tests

TABLE II

| Welding position | Plate thickness, inch | Joint style | Number of passes | Filler wire diam., inch | Shielding gas—Contact tube | | Outer shield | | Welding current | | Travel speed, ins./min. |
|---|---|---|---|---|---|---|---|---|---|---|---|
| | | | | | Type | Tot. flow c.f.h. | Chlorine flow c.f.h. | Type | Flow, c.f.h. | Volts | Amperes | |
| Flat | ½ | 60° V | 4 | ³⁄₃₂ | A+3% Cl₂ | ½ | 0.015 | Argon | 60 | 24–27 | 325 | 15–18 |
| | ¾ | 60° V | 7 | ³⁄₃₂ | A+3% Cl₂ | ½ | 0.015 | ...do | 60 | 24–27 | 325 | 15–18 |
| | 1¼ | 60° Dbl. V | 12 | ³⁄₃₂ | A+3% Cl₂ | ½ | 0.015 | ...do | 60 | 24–27 | 325 | 15–18 |
| Vertical | ½ | 70° V | 6 | ¹⁄₁₆ | A+3% Cl₂ | 2 | 0.06 | ...do | 60 | 25–27 | 220–220 | 16–18 |
| | ¾ | 70° V | 7 (weaved) | ¹⁄₁₆ | A+3% Cl₂ | 2 | 0.06 | ...do | 60 | 25–27 | 200–200 | 16–18 |
| | 1¼ | 60° Dbl. V | 12 (weaved) | ¹⁄₁₆ | A+3% Cl₂ | 2 | 0.06 | ...do | 60 | 25–27 | 200–220 | 16–18 |
| Horizontal | ½ | 70° V | 6 | ¹⁄₁₆ | A+3% Cl₂ | 2 | 0.06 | ...do | 60 | 25–27 | 220–230 | 15–22 |
| | ¾ | 70° V | 10 | ¹⁄₁₆ | A+3% Cl₂ | 2 | 0.06 | ...do | 60 | 25–27 | 220–230 | 15–22 |
| | 1¼ | 60° Dbl. V | 24 | ¹⁄₁₆ | A+3% Cl₂ | 2 | 0.06 | ...do | 60 | 25–27 | 220–230 | 15–22 |
| Overhead | ½ | 70° V | 8 | ¹⁄₁₆ | He+½% Cl₂ | 4 | 0.02 | Helium | 100 | 28–31 | 190–210 | 26–30 |
| | ¾ | 70° V | 8 | ¹⁄₁₆ | He+½% Cl₂ | 4 | 0.02 | ...do | 100 | 28–31 | 190–210 | 26–30 |
| | 1¼ | 60° Dbl. V | 28 | ¹⁄₁₆ | He+½% Cl₂ | 4 | 0.02 | ...do | 100 | 28–31 | 190–210 | 26–30 |

*Example VI*

Several multi-pass fillet welds were made in the horizontal position between 1 inch and 1¼ inch plate sections of electrical conductor grade aluminum alloy, i.e., 99.45% minimum purity aluminum. The filler wire employed was ³⁄₃₂ inch diameter 1100 aluminum alloy, i.e., 99.00% minimum purity aluminum. The welding process used in making the welds was gas-shielded arc-welding with a consumable filler metal electrode. The welding gun employed was similar to that shown in FIGURE 1 wherein the inside diameter of the gun barrel was 0.625 inch. The contact tube had an inside diameter of 0.116 inch and an outside diameter of 0.250 inch. The gases used in making all welds were helium and nitrogen. Helium was passed through the contact tube at a rate of 4 cubic feet per hour while 20 cubic feet per hour of nitrogen gas was passed through the annular space between the contact tube and the gun barrel. A welding current of about 300 amperes and an arc voltage of about 25 volts measured between the welding gun and the work was employed. From two to four passes were made for each weld. During welding the electrode tip was maintained in close proximity to the plane defined by the rim of the indentation in the molten metal directly below the were performed on specimens sectioned from these welds similar to those of Example VI with the exception that plates 30, 33 and 34 were all ½ inch plate. These specimens all fractured in the parent plate and exhibited tensile properties substantially the same as those of Example VI.

*Example VIII*

One multi-pass fillet weld was made in the horizontal position between ½ inch plate sections of electrical conductor grade aluminum alloy, i.e., 99.45% minimum purity aluminum. The filler wire employed was ³⁄₃₂ inch diameter 1100 aluminum alloy, i.e., 99.00% minimum purity aluminum. The size of the gun barrel and contact tube of the welding gun was the same as for Example VI. The welding process used in making the weld was basically the same as Example VI with the exception of kind and quantities of shielding gas employed. Helium was passed through the contact tube at a rate of 5 cubic feet per hour while 20 cubic feet per hour of carbon dioxide was passed through the annular space between the contact tube and the gun barrel. No preheating was employed and the beads were wire brushed between passes. The arc characteristic of this weld appeared satisfactory and the weld penetration was excellent.

Example IX

One multi-pass double V-groove weld was made in the flat position between ¾ inch plate sections of aluminum allow 6061 having a nominal chemical composition of about 1.0% magnesium, 0.6% silicon, 0.25% copper, 0.25% chromium, balance aluminum and impurities in normal amounts. The filler wire employed was ³⁄₃₂ inch diameter wire of aluminum alloy 4043 having a chemical composition of about 5.0% silicon, balance aluminum and impurities in normal amounts. The welding gun employed was similar to that shown in FIGURE 1 wherein the inside diameter of the gun barrel was 0.625 inch. The contact tube had an inside diameter of 0.116 inch and an outside diameter of 0.250 inch. The welding process used in making the weld was gas-shielded arc welding with a consumable filler metal electrode. The gases used were nitrogen and "Airco 75" i.e., approximately 75% helium and 25% argon. "Airco 75" was passed through the contact tube at a rate of 5 cubic feet per hour while 15 cubic feet per hour of nitrogen gas was passed through the annular space between the contact tube and the gun barrel. A welding current of about 300 amperes and an arc voltage of about 30 volts measured at the power source was employed. Six passes were made at about 18 inches per minute. During welding, the electrode tip was maintained in close proximity to the plane defined by the rim of the indentation in the molten metal directly below the electrode tip. No preheating was used and the beads were wire brushed between passes. The weld of this example had good surface appearance and bead contour and exhibited excellent weld penetration.

Example X

One multi-pass weld was made in flat position between two 1 inch plate sections of commercially pure copper. One plate was provided with a 40° bevel at the joint while the other was a square butt at the joint. The welding process used in making the weld was gas-shielded arc welding with a ¹⁄₁₆ inch diameter consumable filler metal electrode wire having a chemical composition substantially the same as that of the parent metal. The welding gun employed was similar to that shown in FIGURE 1 wherein the inside diameter of the gun barrel was 0.625 inch. The contact tube had an inside diameter of 0.081 inch and an outside diameter of 0.250 inch. The gases used in making all welds were helium and nitrogen. Helium was passed through the contact tube at a rate of 5 cubic feet per hour while 15 cubic feet per hour of nitrogen gas was passed through the annular space between the contact tube and the gun barrel. A welding current of about 310 amperes and an arc voltage of about 30 volts measured at the power source was used. Twelve passes were made for the weld at a travel speed of about 18 inches per minute. During welding, the electrode tip was maintained in close proximity to the plane defined by the rim of the indentation in the molten metal directly below the electrode tip. This weld had a good surface appearance and bead contours and exhibited excellent weld penetration.

It will thus be seen from the hereinabove description that by present practices of the instant invention, the soundness of aluminum and aluminum alloy welds made by the protective gas-shielded arc process has been significantly increased and the cost of protective gas-shielded arc welding substantially reduced. The expression, "aluminum alloys" as used herein refers to alloy compositions wherein the constituent aluminum is present in amount of at least 50% and generally is present in amount of at least 90%. Similarly, the expression, "copper alloys" refers to alloy compositions wherein the constituent copper is present in amount of at least 50% and generally is present in amount of at least 90%.

This application is a continuation-in-part of my copending application S.N. 678,724 filed August 16, 1957, now abandoned.

It will be understood that various changes, modifications and alterations may be made in the instant invention without departing from the spirit and scope thereof and as such the invention is not to be limited except by the appended claims, wherein what is claimed is:

1. In the method of gas shielded arc welding of aluminum and aluminum alloys wherein an arc is established between an electrode and the workpiece, filler metal is fed into said arc and an inert gaseous shielding medium is simultaneously fed to shield the arc and weld pool, the improvement comprising providing a gas shield by passing a stream of inert gas selected from the group consisting of argon, helium and mixtures thereof longitudinally of said filler metal electrode in the direction of said arc and closely surrounding said electrode, said inert gas containing from about 0.05 to 3% chlorine by volume and wherein the rate of flow of said gas stream ranges from about 0.035 to 12 cubic feet per hour, and simultaneously therewith passing a gas stream comprising a mixture of argon gas and helium gas in the same direction as said first mentioned stream and surrounding said first mentioned stream.

2. In the method of gas shielded arc welding of aluminum and aluminum alloys wherein an arc is established between an electrode and the workpiece, filler metal is fed into said arc and an inert gaseous shielding medium is simultaneously fed to shield the arc and weld pool, the improvement comprising providing a gas shield by passing a stream of inert gas selected from the group consisting of argon, helium and mixtures thereof longitudinally of said filler metal electrode in the direction of said arc and closely surrounding said electrode, said inert gas containing about 0.5% chlorine by volume, and wherein the rate of flow of said gas stream ranges from about 0.2 to 12 cubic feet per hour, and simultaneously therewith passing a gas stream comprising a mixture of argon gas and helium gas in the same direction as said first mentioned stream and surrounding said first mentioned stream.

3. In the method of gas shielded arc welding of aluminum and aluminum alloys wherein
  an arc is established between an electrode and a work piece,
  filler metal is fed into the arc through a tubular member having an inside diameter slightly larger than the filler metal, and
  a protective gaseous medium is simultaneously fed to shield the arc,
  the improvement comprising the steps of
  maintaining the tip of said electrode in close proximity to the plane defined by the rim of the indentation in the molten metal directly below said electrode tip, and
  employing a protective gaseous medium comprising about 15–20 cu. ft. per hour of a semi-inert gas selected from the group consisting of carbon dioxide and nitrogen, and
    about 4–5 cu. ft. per hour of an inert gas selected from the group consisting of argon, helium and mixtures thereof,
  said inert gas closely surrounding said arc and said semi-inert gas surrounding said inert gas.

4. In the method of gas shielded arc welding of aluminum and aluminum alloys wherein
  an arc is established between an electrode and a work piece,
  filler metal is fed into the arc through a tubular member having an inside diameter slightly larger than the filler metal, and
  a protective gaseous medium is simultaneously fed to shield the arc,
  the improvement comprising the steps of
  maintaining the tip of said electrode in close proximity to the plane defined by the rim of the indentation in the molten metal directly below said electrode tip, and employing a protective gaseous medium comprising
  about 15–20 cu. ft. per hour of a semi-inert gas selected from the group consisting of carbon dioxide and nitrogen, and
  about 4–5 cu. ft. per hour of an inert gas selected from the group consisting of argon, helium and mixtures thereof,
said inert gas containing about 0.001–0.36 cu. ft. per hour of chlorine,
said inert gas closely surrounding said arc and said semi-inert gas surrounding said inert gas.

5. In the method of gas shielded arc welding of aluminum and aluminum alloys wherein
  an arc is established between an electrode and a work piece,
  filler metal is fed into the arc through a tubular member having an inside diameter slightly larger than the filler metal, and
  a protective gaseous medium is simultaneously fed to shield the arc,
the improvement comprising
  employing a protective gaseous medium comprising
    (1) about 35–150 cu. ft. per hour of an inert gas selected from the group consisting of argon, helium and mixtures thereof, and
    (2) about 0.035–12 cu. ft. per hour of an inert gas selected from the group consisting of argon, helium and mixtures thereof,
  said inert gas (2) containing about 0.001–0.36 cu. ft. per hour of chlorine,
  and inert gas (2) closely surrounding said arc and said inert gas (1) surrounding said inert gas (2).

References Cited in the file of this patent

UNITED STATES PATENTS

| | | |
|---|---|---|
| 2,504,868 | Muller | Apr. 18, 1950 |
| 2,522,482 | Olzak | Sept. 12, 1950 |
| 2,544,801 | Muller et al. | Mar. 13, 1951 |
| 2,591,926 | Gibson et al. | Apr. 8, 1952 |
| 2,852,659 | Belz et al. | Sept. 16, 1958 |
| 2,859,328 | Sohn | Nov. 4, 1958 |
| 2,859,329 | Lesnewich | Nov. 4, 1958 |
| 2,863,981 | Thomas et al. | Dec. 9, 1958 |
| 2,903,559 | Wempe | Sept. 8, 1959 |
| 2,907,865 | Gibson et al. | Oct. 6, 1959 |
| 2,922,024 | Cresswell | Jan. 19, 1960 |
| 2,929,912 | Lesnewich | Mar. 22, 1960 |
| 2,950,377 | Thomas et al. | Aug. 23, 1960 |

UNITED STATES PATENT OFFICE
CERTIFICATE OF CORRECTION

Patent No. 3,102,188                                August 27, 1963

Kenneth L. Wills

It is hereby certified that error appears in the above numbered patent requiring correction and that the said Letters Patent should read as corrected below.

Columns 7 and 8, TABLE II, under the sub-heading "Amperes", fourth and fifth entries, for $\begin{array}{c}220-220\\200-200\end{array}$ read $\begin{array}{c}200-220\\200-220\end{array}$ column 12, line 6, for "and", first occurrence, read -- said --.

Signed and sealed this 2nd day of June 1964.

(SEAL)
Attest:

ERNEST W. SWIDER                           EDWARD J. BRENNER
Attesting Officer                                Commissioner of Patents